Patented May 7, 1929.

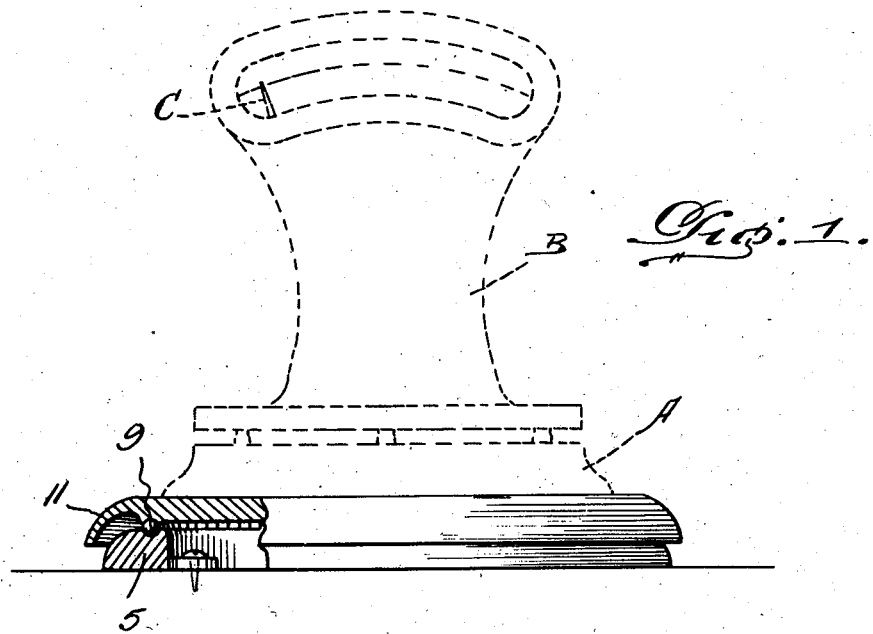
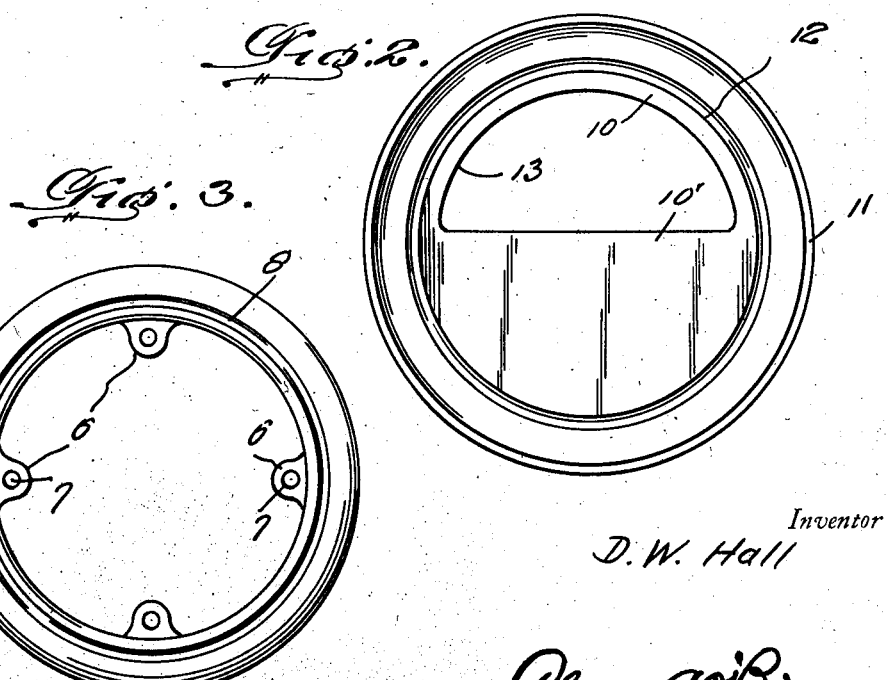
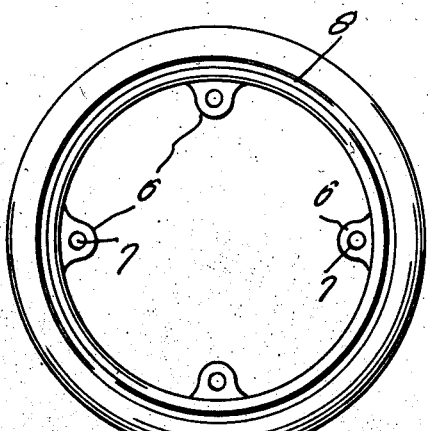

1,711,564

UNITED STATES PATENT OFFICE.

DAVID WILLIAM HALL, OF McALESTER, OKLAHOMA.

SUPPORT FOR WEIGHING SCALES.

Application filed April 30, 1927. Serial No. 187,921.

This invention relates generally to weighing scales such as those employed on the counters of grocery stores and the like, the invention having specific reference to a support therefor which is of such a construction as to permit the scales to be turned to any desired position, with the end in view that they may be used regardless whether or not the merchant is in front of or back of the counter.

In carrying out my invention there is provided a highly novel, simple, and relatively inexpensive support that may be easily anchored to a counter or table, and upon which a conventional weighing scale may be disposed, said support consisting of a stationary lower and rotatable upper member with the end in view as hereinbefore stated to permit the scale to be turned to any desired angle.

In the drawing wherein like numerals indicate corresponding parts:

Figure 1 is a view partially in front elevation and partially in longitudinal section of my improved scale support, a conventional weighing scale being disclosed in dotted lines thereon.

Figure 2 is a bottom plan view of the uppermost rotatably mounted member of the support, and Figure 3 is a top plan view of the lowermost member.

Now having particular reference to the drawing, my novel invention consists of a stationary member 5 which is of ring-like formation, flat on its bottom side and of rounded contour at its top side as clearly indicated in Figures 1 and 3. This ring-like member is formed at its inner edge and at its lower surface with inwardly projecting ears 6 formed with openings 7 to facilitate the anchoring of the ring to the counter, table or the like.

The top surface of this ring member 5 is formed adjacent its inner edge with a circumferential ball bearing receiving channel 8 within which are disposed a series of ball bearings 9.

The invention further consists of a circular rim 10 having a circumferential skirt 11 that projects from the upper surface thereof, and that is curved downwardly so as to engage in spaced relation over the top surface of the ringlike member 5. The bottom surface of this rim member 10 is formed with a circumferential channel 12 for receiving the top of the ball bearings 9 when disposed in position upon the ring like member 5 with the end in view that said rim 10 may be readily rotated with respect to the ring like member.

In Figure 1 there is disclosed in dotted lines a conventional weighing scale A. As is well known, at the back of such scales there arises a vertical standard B, the upper end of which is provided with the usual indicating means, and within which is movable the usual pointer or weight designating member C. Obviously, by reason of this mechanism at the rear of the scales the rear thereof is of greater weight than the forward portion. In order to overcome this added weight at the rear of the scales, a web 10' is formed within the rim in the manner shown, and upon which the platform portion, or in fact the lighter portion of the scale, is adapted to rest, to the obvious end, that the pressure on the ball bearings 9 will be substantially equally distributed throughout the entire compass thereof so that there will be little or no liability of the rim 10 binding and thus effecting the free turning movement of the scales and consequently said rim 10.

It will thus be seen that I have provided a highly novel, simple and useful scales support that is well adapted for all the purposes heretofore designated, even though I have herein shown and described the invention as consisting of certain detail structural elements it is nevertheless to be understood that some changes may be made therein without affecting the spirit and scope of the appended claim.

Having thus described the invention, what I claim as new is:—

In a support for scales wherein the weight of the scale is eccentrically disposed, a base, a rim rotatable on said base, bearing members between the base and said rim, and a counter-weighted web within the rim and located eccentrically thereof and of sufficient weight to equalize the weight of the eccentrically disposed portion of the scale to be supported upon that portion of the rim opposite the counter-weight, when the lighter portion of the scale is resting upon the said web.

In testimony whereof I have affixed my signature.

DAVID WILLIAM HALL.